(12) United States Patent
Wu

(10) Patent No.: US 10,143,035 B2
(45) Date of Patent: Nov. 27, 2018

(54) DEVICE AND METHOD OF HANDLING COMMUNICATION WITH COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/792,784

(22) Filed: Oct. 25, 2017

(65) Prior Publication Data

US 2018/0049273 A1 Feb. 15, 2018

Related U.S. Application Data

(62) Division of application No. 15/616,947, filed on Jun. 8, 2017, now Pat. No. 10,064,236.

(Continued)

(51) Int. Cl.
| | |
|---|---|
| *H04W 76/38* | (2018.01) |
| *H04W 76/30* | (2018.01) |
| *H04W 76/27* | (2018.01) |
| *H04W 76/25* | (2018.01) |
| *H04W 24/02* | (2009.01) |
| *H04W 88/02* | (2009.01) |
| *H04L 5/00* | (2006.01) |

(52) U.S. Cl.
CPC ........... *H04W 76/38* (2018.02); *H04L 5/0055* (2013.01); *H04W 76/25* (2018.02); *H04W 76/27* (2018.02); *H04W 76/30* (2018.02); *H04W 24/02* (2013.01); *H04W 88/02* (2013.01)

(58) Field of Classification Search
None
See application file for complete search history.

(56) References Cited

U.S. PATENT DOCUMENTS

2009/0312004 A1 12/2009 Farnsworth
2012/0269122 A1* 10/2012 Lee ...................... H04W 76/36
370/328

(Continued)

OTHER PUBLICATIONS

Search Report dated Nov. 10, 2017 for EP application No. 17174990.6, pp. 1-19.

(Continued)

*Primary Examiner* — Frantz Bataille
(74) *Attorney, Agent, or Firm* — Winston Hsu

(57) ABSTRACT

A base station (BS) of handling communication with a communication device comprises a storage device for storing instructions and a processing circuit coupled to the storage device. The processing circuit is configured to execute the instructions stored in the storage device. The instructions comprise configuring a radio resource control (RRC) connection to the communication device; transmitting an RRCConnectionRelease message via the RRC connection to the communication device; determining that the communication device leaves a connected mode after a first duration from transmitting the RRCConnectionRelease message, when the communication device is in a coverage enhancement (CE) mode; and determining that the communication device leaves the connected mode after a second duration from transmitting the RRCConnectionRelease message, when the communication device is not in the CE mode.

10 Claims, 7 Drawing Sheets

Related U.S. Application Data

(60) Provisional application No. 62/401,902, filed on Sep. 30, 2016, provisional application No. 62/367,629, filed on Jul. 27, 2016, provisional application No. 62/347,102, filed on Jun. 8, 2016.

(56) References Cited

U.S. PATENT DOCUMENTS

| | | | | |
|---|---|---|---|---|
| 2014/0185548 A1* | 7/2014 | Lee | ...................... | H04W 48/20 370/329 |
| 2015/0043533 A1* | 2/2015 | Kim | ...................... | H04W 48/20 370/331 |
| 2015/0117398 A1 | 4/2015 | Yang | | |
| 2016/0127918 A1 | 5/2016 | Yi | | |

OTHER PUBLICATIONS

3GPP TS 36.331 V13.1.0 (Mar. 2016), "3rd Generation Partnership Project; Technical Specification Group Radio Access Network; Evolved Universal Terrestrial Radio Access (E-UTRA); Radio Resource Control (RRC); Protocol specification (Release 13)", XP051088537, pp. 1-551.
Ericsson, "RRC connection release timer", 3GPP TSG-RAN WG2 #62, R2-082168, May 5-9, 2008, Kansas City, USA, XP050139943, pp. 1-5.
Huawei, HiSilicon, Neul Ltd., "Summary of [95#39][NB-IoT] NB-IoT RRC Processing Delays EMail Discussion", 3GPP TSG-RAN WG2 Meeting #95bis, R2-166315, Oct. 10-14, 2016, Kaohsiung, XP051150887, pp. 1-9.
Ericsson, "Acknowledgement delay of RRCConnectionRelease message in NB-IoT", 3GPP TSG-RAN2 Meeting #95bis, R2-166557, Oct. 10-14, 2016, Kaohsiung, Taiwan, XP051150589, pp. 1-3.
HTC, "Discussion on RRC connection release", 3GPP TSG-RAN2 Meeting #95bis, R2-166697, Oct. 16-20, 2016, Kaohsiung, Taiwan, XP051161821, pp. 1-2.
3GPP TS 36.300 V13.5.0, Sep. 2016.
3GPP TS 36.331 V13.2.0, Jun. 2016.
Office action dated Jan. 19, 2018 for the Taiwan application No. 106119053, filing date Jun. 8, 2017, p. 1-8.
Office action dated Oct. 19, 2017 for the U.S. Appl. No. 15/616,947, filed Jun. 8, 2017, pp. 1-18.

* cited by examiner

DEVICE AND METHOD OF HANDLING COMMUNICATION WITH COMMUNICATION DEVICE

CROSS REFERENCE TO RELATED APPLICATIONS

This application is a divisional application of U.S. application Ser. No. 15/616,947, filed on Jun. 8, 2017. The U.S. application Ser. No. 15/616,947 claims the benefits of U.S. Provisional Applications No. 62/347,102, filed on Jun. 8, 2016, No. 62/367,629, filed on Jul. 27, 2016, and No. 62/401,902, filed on Sep. 30, 2016.

BACKGROUND OF THE INVENTION

1. Field of the Invention

The present invention relates to a device and a method used in a wireless communication system, and more particularly, to a device and method of handling communication with a communication device.

2. Description of the Prior Art

A user equipment (UE) may not have sufficient time to transmit an acknowledgement of a reception of a RRCConnectionRelease message to a base station (BS), after receiving the RRCConnectionRelease message from the BS. Accordingly, the BS does not know whether the UE receives the RRCConnectionRelease message, and retransmits the RRCConnectionRelease message. Thus, communication between the UE and the BS cannot be performed efficiently.

Thus, how to communicate with the BS efficiently is an important problem to be solved.

SUMMARY OF THE INVENTION

The present invention therefore provides a method and related device for handling communication with a communication device to solve the abovementioned problem.

A base station (BS) of handling communication with a communication device comprises a storage device for storing instructions and a processing circuit coupled to the storage device. The processing circuit is configured to execute the instructions stored in the storage device. The instructions comprise configuring a radio resource control (RRC) connection to the communication device; transmitting an RRCConnectionRelease message via the RRC connection to the communication device; determining that the communication device leaves a connected mode after a first duration from transmitting the RRCConnectionRelease message, when the communication device is in a coverage enhancement (CE) mode; and determining that the communication device leaves the connected mode after a second duration from transmitting the RRCConnectionRelease message, when the communication device is not in the CE mode.

A base station (BS) of handling communication with a first communication device and a second communication device comprises a storage device for storing instructions and a processing circuit coupled to the storage device. The processing circuit is configured to execute the instructions stored in the storage device. The instructions comprise configuring a first radio resource control (RRC) connection to the first communication device and a second RRC connection to the second communication device; transmitting a first RRCConnectionRelease message via the first RRC connection to the first communication device and a second RRCConnectionRelease message via the second RRC connection to the second communication device; determining that the first communication device leaves a connected mode after a first duration from transmitting the first RRCConnectionRelease message, when the first communication device is in a coverage enhancement (CE) mode; and determining that the second communication device leaves the connected mode after a second duration from transmitting the second RRCConnectionRelease message, when the second communication device is not in the CE mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
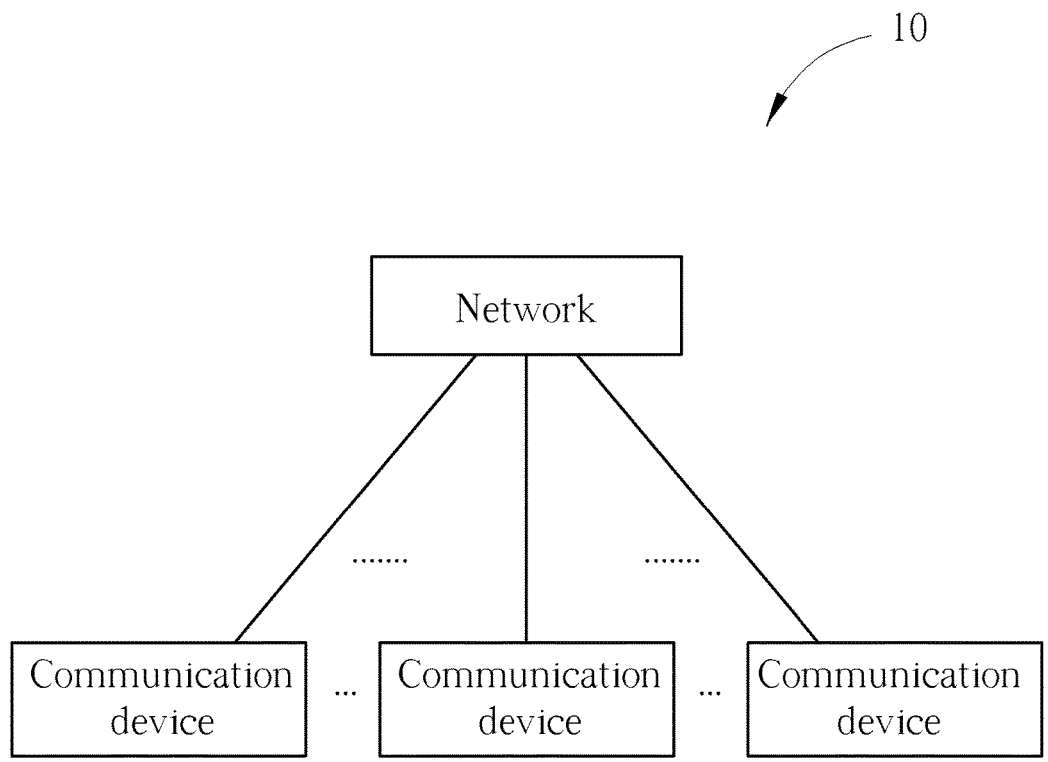
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved UTRAN (E-UTRAN) including at least one evolved NB (eNB) or a fifth generation (5G) RAN including at least one 5G base station (BS). Further, the network may also include both the E-UTRAN/5G RAN and a core network (CN).

The communication device may be a user equipment (UE), a mobile phone, a laptop, a tablet computer, an electronic book, a portable computer system, a vehicle or an aircraft. For an uplink (UL), the communication device is the transmitter and the network is the receiver, and for a downlink (DL), the network is the transmitter and the communication device is the receiver.

Figure 2:
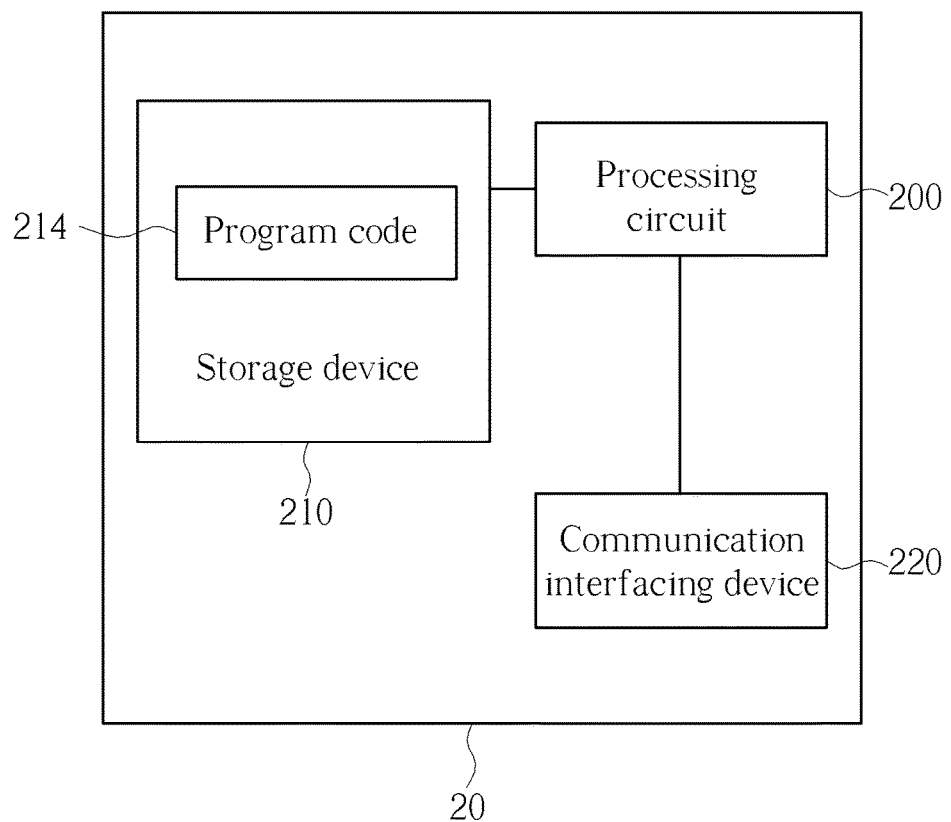
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that stores a program code 214, accessed and executed by the processing circuit 200. Examples of the storage device 210 include but are not limited to a read-only memory (ROM), flash memory, random-access memory (RAM), hard disk, optical data storage device, non-volatile storage device, non-transitory computer-readable medium (e.g., tangible media), etc. The communication interfacing device 220 includes a transceiver used to transmit and receive signals (e.g., data, signals, messages and/or packets) according to processing results of the processing circuit 200.

In the following diagrams and examples, a UE is used for representing the communication device in FIG. 1, to simplify the illustration of the examples.

Figure 3:
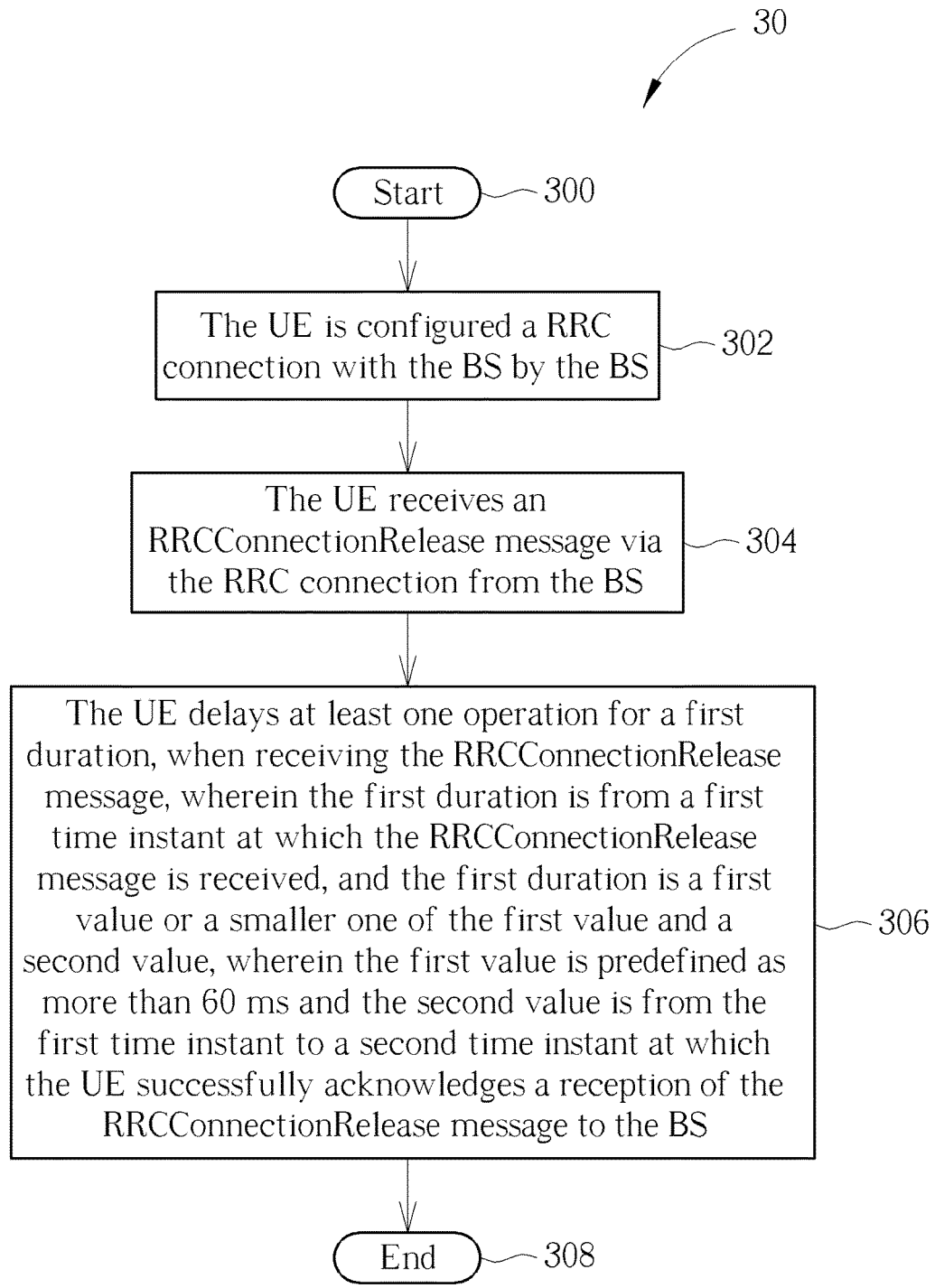
FIG. 3 is a flowchart of a process according to an example of the present invention.

FIG. 3 is a flowchart of a process 30 according to an example of the present invention. The process 30 may be utilized in a UE (e.g., the communication device in FIG. 1), to handle communication with a BS (e.g., the network in FIG. 1). The process 30 includes the following steps:

Step 300: Start.

Step 302: The UE is configured a radio resource control (RRC) connection with the BS by the BS.

Step 304: The UE receives an RRCConnectionRelease message via the RRC connection from the BS.

Step 306: The UE delays at least one operation for a first duration, when receiving the RRCConnectionRelease message, wherein the first duration is from a first time instant at which the RRCConnectionRelease message is received, and the first duration is a first value or a smaller one of the first value and a second value, wherein the first value is predefined as more than 60 ms and the second value is from the first time instant to a second time instant at which the UE successfully acknowledges a reception of the RRCConnectionRelease message to the BS.

Step 308: End.

After the duration above, the UE performs the at least one operation. The following examples may be applied for realizing the process 30.

In one example, the first time instant may be a predetermined or predefined time instant. That is, the first duration may be a predetermined or predefined duration. In one example, the UE may determine it successfully acknowledges the reception of the RRCConnectionRelease message.

In one example, the UE may delay the at least one operation for the first duration, if the UE is a Bandwidth Reduced Low Complexity (BL) UE, a Narrow Band Internet of Things (NB-IoT) UE or in a Coverage Enhancement (CE) mode.

In one example, the UE may delay the at least one operation for a second duration from the first time instant, if the UE is none of the BL UE, the NB-IoT UE and in the CE mode. In one example, the second duration may be shorter than the first duration. In one example the second duration may be a third value or a smaller one of the third value and the second value, wherein the third value is predefined as 60 ms. For example, the UE performs the at least one operation, if 60 ms elapses from the first time instant and the UE has not successfully transmitted an acknowledgement acknowledging the RRCConenctionRelease message to the BS. In one example, the UE may delay the at least one operation for a third duration which is from the first time instant to a time instant at which the UE successfully acknowledges the reception of the RRCConnectionRelease message to the BS, if the UE is none of the BL UE, the NB-IoT UE and in the CE mode. The third duration may be shorter than the first duration.

In one example, the UE may delay the at least one operation for the first duration, if the UE is in a first CE mode (e.g., CE mode B). In one example, the UE may delay the at least one operation for the second duration or the third duration, if the UE is in a second CE mode (e.g., CE mode A). The third duration may be shorter than the first duration.

In one example, the UE may delay the at least one operation for a larger one of the first value and the second value instead of the smaller one, if the UE is a BL UE, a NB-IoT UE or in a CE mode.

In the above examples, "the first CE mode" may be replaced by "a first CE level (e.g., CE level 2 or 3)", and "the second CE mode" may be replaced by "a second CE level (e.g., CE level 0 or 1)".

A UE may support the CE mode and a non-CE mode (i.e., not in the CE mode). In one example, the UE in the CE mode may delay the at least one operation for a fourth duration which is X ms from a time instant at which an RRCConnectionRelease message is received. The UE in the non-CE mode may delay the at least one operation for a fifth duration which is Y ms from a time instant at which an RRCConnectionRelease message is received, where X>Y. In one example, M and N may be used to determine X and Y, wherein X≥M, Y≤N and M≥N. For example, M=N=60, and X=200 and Y=60. For example, M=120 and N=60, and X=1250 and Y=60.

In one example, the UE in the CE mode may delay the at least one operation for a sixth duration which is from a time instant at which the RRCConnectionRelease message is received until the UE successfully acknowledges that a reception of the RRCConnectionRelease message. In one example, the UE in the CE mode may delay the at least one operation for an earlier one or a later one of the fourth duration and the sixth duration. In one example, the UE in the non-CE mode may delay the at least one operation for an earlier one or a later one of the fifth duration and the sixth duration. In one example, M=N=60. In one example, M=120 and N=60. In one example, X=480 and Y=60. In one example, X=300 and Y=60.

In one of the above examples, X and/or Y may be predetermined or predefined in the third Generation Partnership Project (3GPP) standard, or may be calculated by the UE. In another example, X and/or Y may be configured by the BS in the RRCConnectionRelease message or in a RRC message, e.g., RRCConnectionReconfiguration message or a broadcasted system information block.

In one example, a duration for delaying the at least one operation may be included in the RRCConnectionRelease message, and the UE may perform the at least one operation after the duration is passed (e.g., elapses). In one example, the duration may be 300 ms, and the UE may leave a connected mode after 300 ms from a time instant at which the RRCConnectionRelease message is received. That is, the UE delays leaving the connected mode for 300 ms after the time instant at which the RRCConnectionRelease message is received. In one example, the duration may be greater than (or equal to) M ms, wherein M may be 60, 120, 300, 360, 420, or 480.

In one example, the duration described above may be derived from 60*N, where N is a positive integer (e.g., 2, 3, . . . , 60, 61, 62, . . . , 100, . . . , etc.), and is not limited herein. In one example, the BS may apply a same value of "N" or different values of "N" for a BL UE, the UE in a CE mode or a NB-IoT UE. In one example, the BS may apply N=2 or 3 for the BL UE and may apply N=2 or 3 for the UE in the CE mode, while the BS may apply N=61 for the NB-IoT UE. In one example, the BS may apply a larger N for the NB-IoT than that for the BL UE and/or the UE in the CE mode.

In one example, the at least one operation may include at least one of resetting a Medium Access Control (MAC), releasing all radio resources (e.g., a Radio Link Control (RLC) entity, MAC configuration and an associated Packet Data Convergence Protocol (PDCP) entity for all established Radio Bearers (RBs)), indicating a release of the RRC connection and a release cause to upper layers, indicating a release of LTE-Wireless Local Area Network (WLAN) aggregation (LWA) configuration to the upper layers which is configured, entering an idle mode, leaving a connected mode and starting a timer (e.g., timer T320 or time T350).

Figure 4:
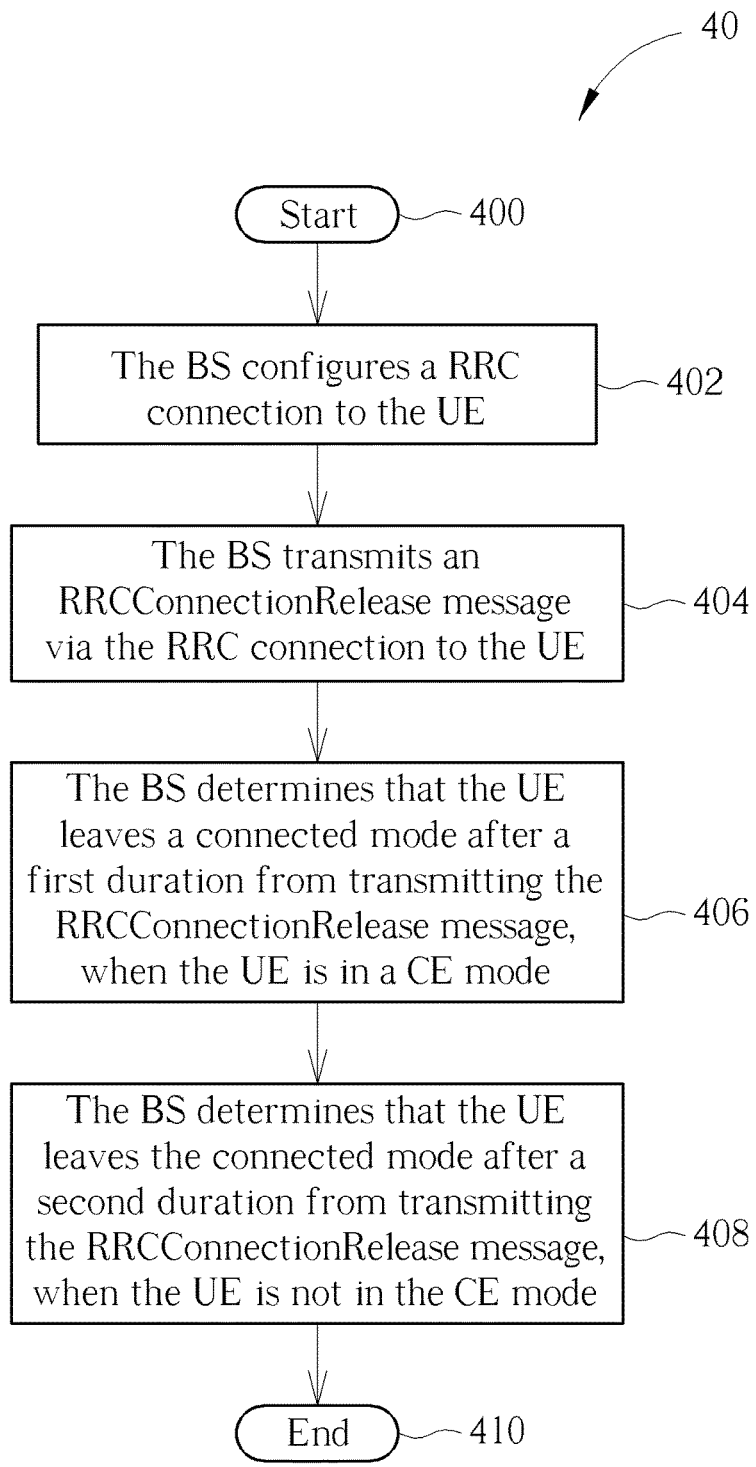
FIG. 4 is a flowchart of a process according to an example of the present invention.

FIG. 4 is a flowchart of a process 40 according to an example of the present invention. The process 40 may be utilized in a BS (e.g., the network in FIG. 1), to handle communication with a UE (e.g., the communication device in FIG. 1). The process 40 includes the following steps:

Step 400: Start.

Step 402: The BS configures a RRC connection to the UE.

Step 404: The BS transmits an RRCConnectionRelease message via the RRC connection to the UE.

Step 406: The BS determines that the UE leaves a connected mode after a first duration from transmitting the RRCConnectionRelease message, when the UE is in a CE mode.

Step 408: The BS determines that the UE leaves the connected mode after a second duration from transmitting the RRCConnectionRelease message, when the UE is not in the CE mode.

Step 410: End.

Figure 5:
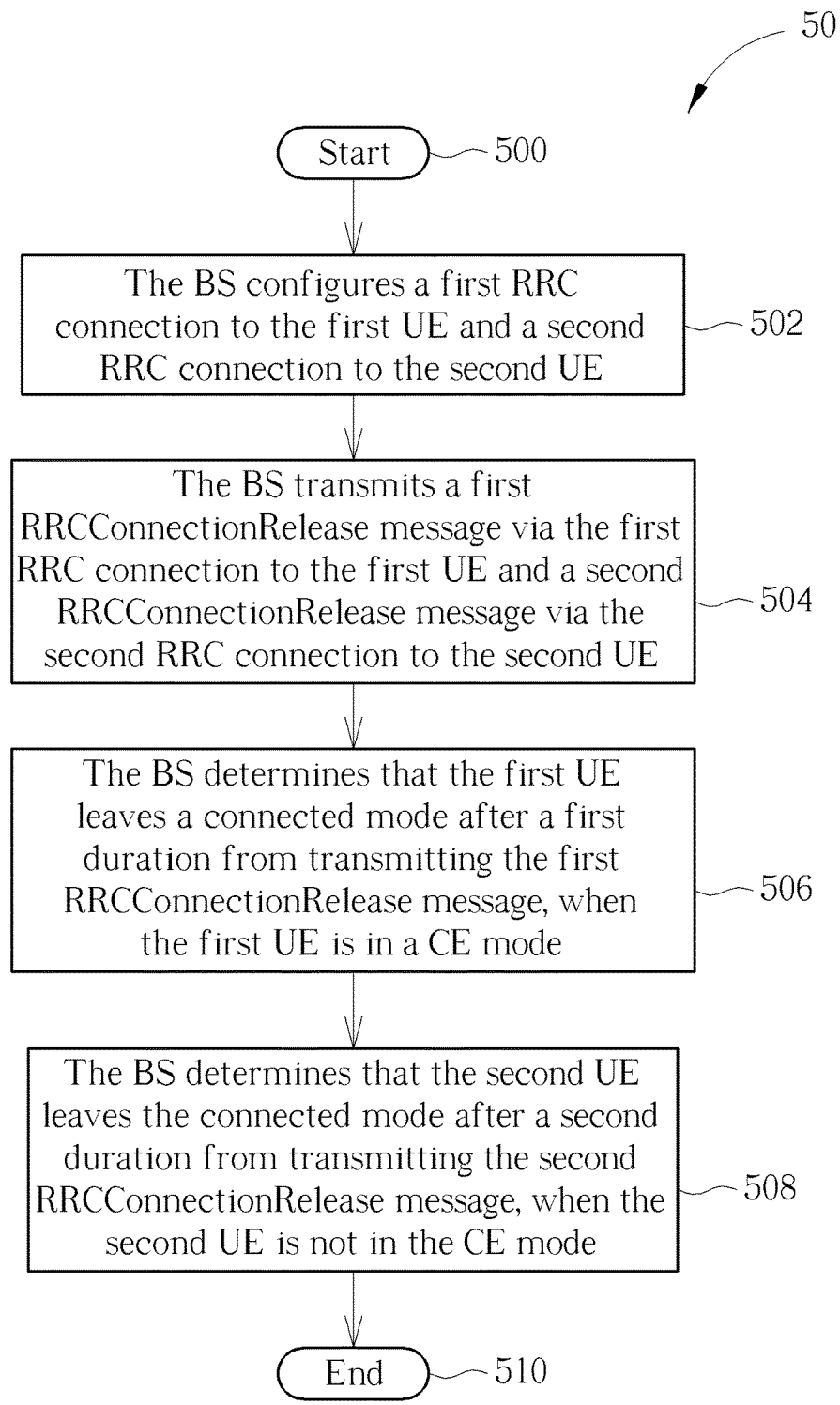
FIG. 5 is a flowchart of a process according to an example of the present invention.

FIG. 5 is a flowchart of a process 50 according to an example of the present invention. The process 50 may be utilized in a BS (e.g., the network in FIG. 1), to handle communication with a first UE (e.g., the communication device in FIG. 1) and a second UE (e.g., another communication device in FIG. 1). The process 50 includes the following steps:

Step 500: Start.

Step 502: The BS configures a first RRC connection to the first UE and a second RRC connection to the second UE.

Step 504: The BS transmits a first RRCConnectionRelease message via the first RRC connection to the first UE and a second RRCConnectionRelease message via the second RRC connection to the second UE.

Step 506: The BS determines that the first UE leaves a connected mode after a first duration from transmitting the first RRCConnectionRelease message, when the first UE is in a CE mode.

Step 508: The BS determines that the second UE leaves the connected mode after a second duration from transmitting the second RRCConnectionRelease message, when the second UE is not in the CE mode.

Step 510: End.

The following examples may be applied for realizing the process 40 and/or 50.

In one example, the BS may not schedule any dedicated control message and/or dedicated data to a UE (e.g., the UE, the first UE or the second UE), when the BS considers that the UE leaves the connected mode (e.g., enters an idle mode, a lightly connected mode or an inactive mode). If the BS or a network of the BS has data to transmit to the UE, the BS or the network may page the UE to make the UE to enter the connected mode again. In one example, an operation performed after the BS considers that a UE (e.g., the UE, the first UE or the second UE) leaves the connected mode may include that the BS releases the RRC connection of the UE and/or access stratum (AS) configuration (e.g., AS-Config) of the UE.

The first duration may be longer than the second duration since it takes more time to transmit repetitions of a MAC PDU including the RRCConnectionRelease message or the first/second RRCConnectionRelease message. In one example, the BS may determine the first duration and the second duration as examples described for the process 30. In one example, the first duration may be predetermined or predefined, e.g., as around 60 ms or exactly 60 ms. In one example the second duration may be determined according to a number of repetitions used for transmitting the MAC PDU. In one example, the second duration may be determined according to a repetition level of the CE mode (e.g., level 1, 2, 3 or 4). In one example, the second duration may be determined according to the CE mode (e.g., CE mode A or CE mode B). The BS or the network may transmit a RRC message (e.g., RRCConnectionReconfiguration) configuring the repetition level or the CE mode to the UE. In one example, the second duration may be predetermined or predefined, and may not depend on the number of repetitions, the repetition level or the CE mode.

In one example, the BS starts a first timer for counting the first duration, and starts a second timer for counting the second duration. In one example, the BS starts the first/second timer when transmitting or in response to the (first/second) RRCConenctionRelease message. In another example, the BS starts the first/second timer in a predetermined time instant after transmitting the (first/second) RRCConenctionRelease message.

In one example, the BS determines that a UE (e.g., the UE, the first UE or the second UE) leaves a connected mode, when the BS receives an acknowledgement acknowledging a reception of the RRCConnectionRelease message (e.g., the RRCConnectionRelease message in the process 40, or the first/second RRCConnectionRelease message in the process 50) from the UE, before the first/second duration is passed (e.g., elapses). In one example, the acknowledgement may be a Hybrid Automatic Repeat Request (HARQ) acknowledgement acknowledging a reception of the MAC PDU including the RRCConnectionRelease message, or may be a RLC acknowledgement acknowledging a reception of a RLC PDU including the RRCConnectionRelease message.

In one example, the BS may configure or determine the UE in the CE mode or not. The BS may configure or determine the first UE in the CE mode and the second UE not in the CE mode.

Figure 6:
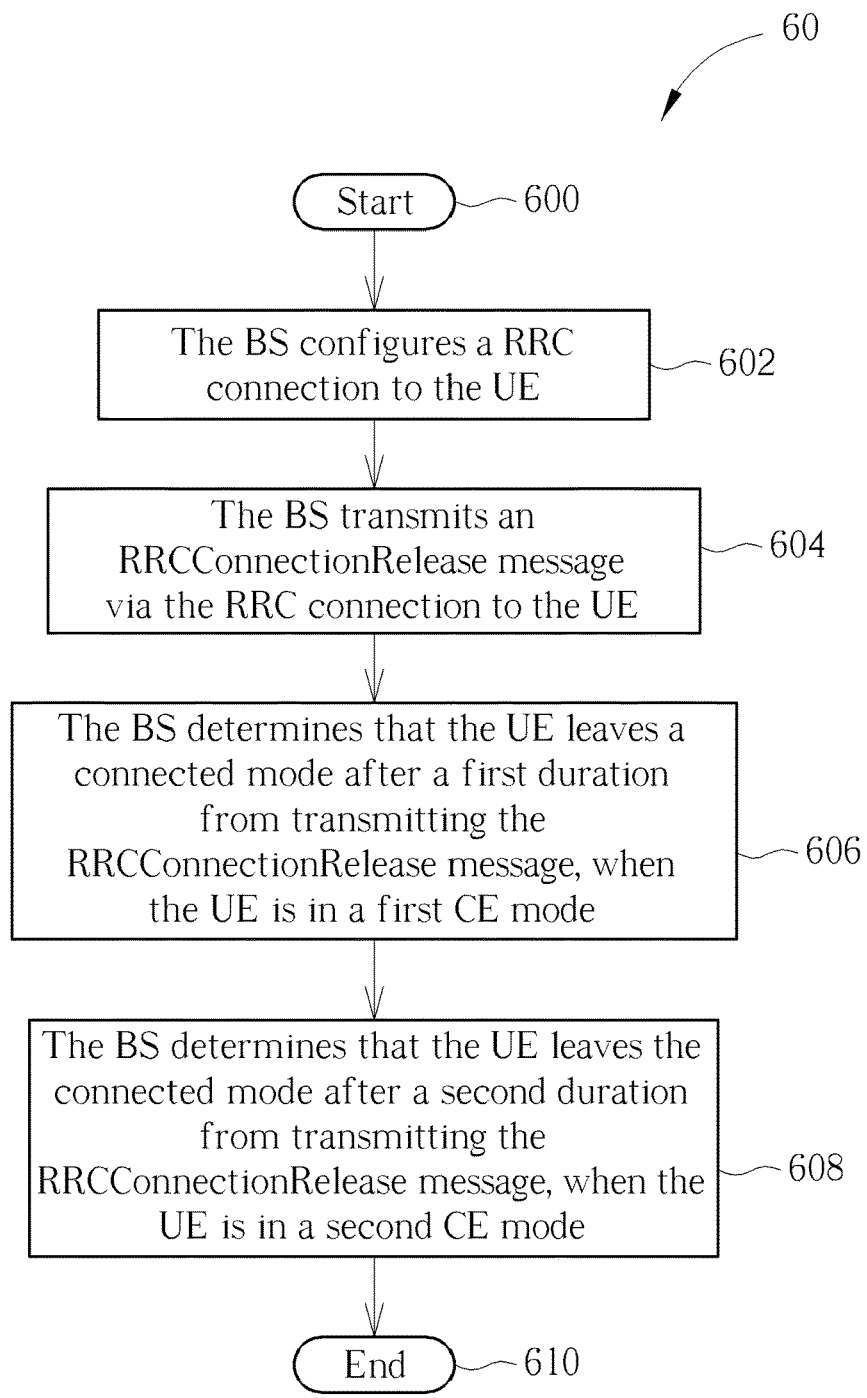
FIG. 6 is a flowchart of a process according to an example of the present invention.

FIG. 6 is a flowchart of a process 60 according to an example of the present invention. The process 60 may be utilized in a BS (e.g., the network in FIG. 1), to handle communication with a UE (e.g., the communication device in FIG. 1). The process 60 includes the following steps:

Step 600: Start.

Step 602: The BS configures a RRC connection to the UE.

Step 604: The BS transmits an RRCConnectionRelease message via the RRC connection to the UE.

Step 606: The BS determines that the UE leaves a connected mode after a first duration from transmitting the RRCConnectionRelease message, when the UE is in a first CE mode.

Step 608: The BS determines that the UE leaves the connected mode after a second duration from transmitting the RRCConnectionRelease message, when the UE is in a second CE mode.

Step 610: End.

Figure 7:
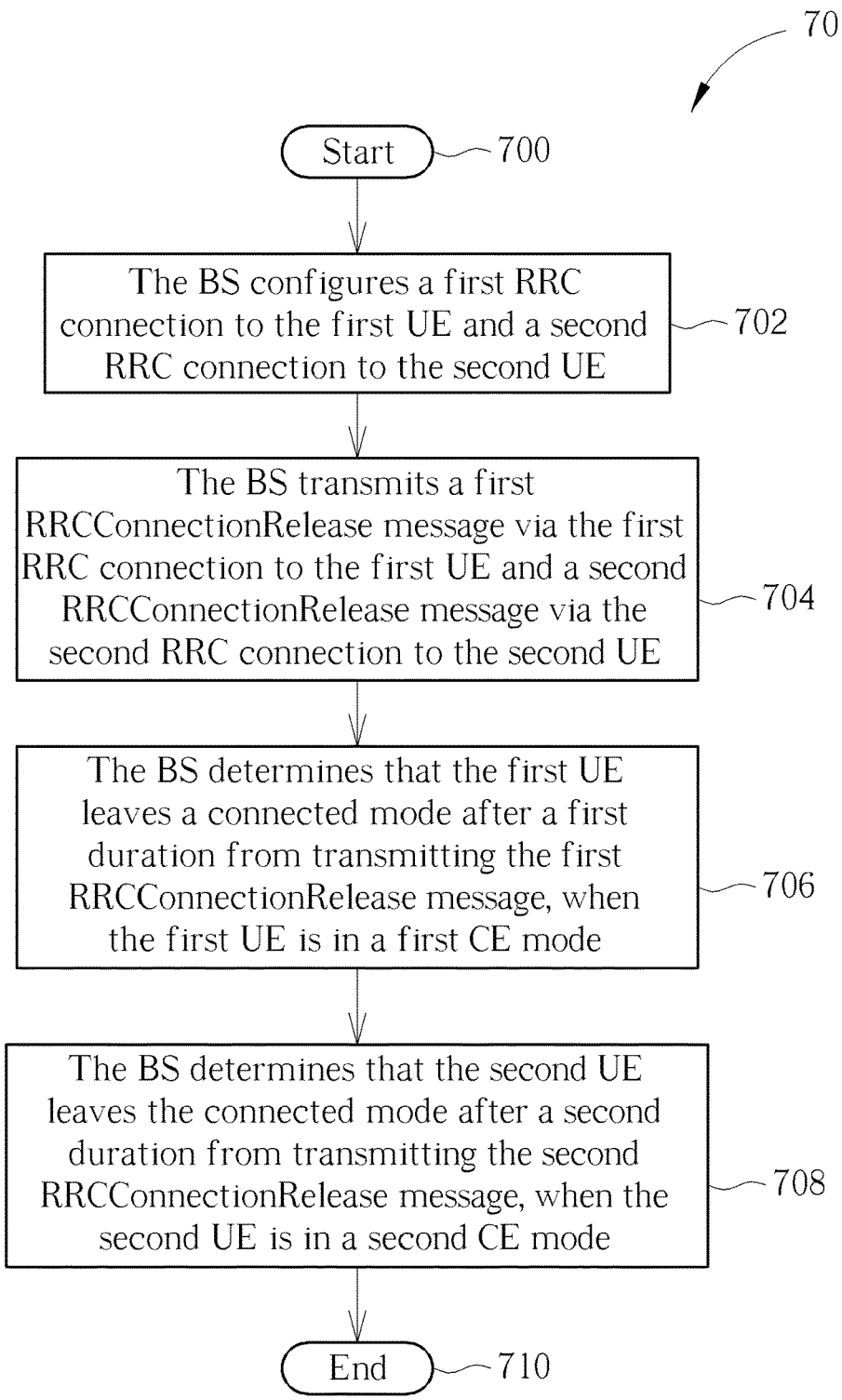
FIG. 7 is a flowchart of a process according to an example of the present invention.

FIG. 7 is a flowchart of a process 70 according to an example of the present invention. The process 70 may be utilized in a BS (e.g., the network in FIG. 1), to handle communication with a first UE (e.g., the communication device in FIG. 1) and a second UE (e.g., another communication device in FIG. 1). The process 70 includes the following steps:

Step 700: Start.

Step 702: The BS configures a first RRC connection to the first UE and a second RRC connection to the second UE.

Step 704: The BS transmits a first RRCConnectionRelease message via the first RRC connection to the first UE and a second RRCConnectionRelease message via the second RRC connection to the second UE.

Step 706: The BS determines that the first UE leaves a connected mode after a first duration from transmitting the first RRCConnectionRelease message, when the first UE is in a first CE mode.

Step 708: The BS determines that the second UE leaves the connected mode after a second duration from transmitting the second RRCConnectionRelease message, when the second UE is in a second CE mode.

Step 710: End.

The following examples may be applied for realizing the process 60 and/or 70.

The processes 60 and 70 are similar to the processes 40 and 50, respectively. Some examples of the processes 40 and 50 may be applied to the processes 60 and 70 by replacing "not in the CE mode" by "the first CE mode", and replacing "the CE mode" by "the second CE mode". In one example, the first CE mode may be the CE mode A, and the second CE mode may be the CE mode B. In one example, the first CE mode may be replaced by "a first CE level", and the second CE mode may be replaced by "a second CE level".

The first duration may be longer than the second duration since the BS transmits more repetitions for a MAC PDU including the RRCConnectionRelease message or the first/second RRCConnectionRelease message for the UE/the second UE in the first CE mode than the UE/the first UE in the second CE mode. In one example, the BS determines the first/second duration according to a number of repetitions used for transmitting the MAC PDU. In one example, the BS may determine the first duration and the second duration as examples described for the process 30. In one example, the BS determines the first/second duration according to a repetition level of the first/second CE mode (e.g., level 1, 2 for the second CE mode and level 3, 4 for the first CE mode). In one example, the BS determines the first/second duration according to the first/second CE mode. The BS or the network may transmit a RRC message (e.g., RRCConnectionReconfiguration) configuring the repetition level or the first/second CE mode to the UE. In one example, the first/second duration may be predetermined or predefined, and may not depend on the number of repetitions, the repetition level and the CE mode.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20. Any of the abovementioned processes may be compiled into the program code 214.

To sum up, the present invention provides a method and related device for handling communication with a UE. Accordingly, the UE has sufficient time to transmit an acknowledgement of a reception of a RRCConnectionRelease message to the BS. Thus, the BS may know the UE receives the RRCConnectionRelease message, and does not retransmit the RRCConnectionRelease message. As a result, communication between the UE and the BS is performed efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) of handling communication with a communication device, comprising:
   a storage device, for storing instructions of:
   configuring a radio resource control (RRC) connection to the communication device;
   transmitting an RRCConnectionRelease message via the RRC connection to the communication device;
   determining that the communication device leaves a connected mode after a first duration from transmitting the RRCConnectionRelease message, when the communication device is in a coverage enhancement (CE) mode; and
   determining that the communication device leaves the connected mode after a second duration from transmitting the RRCConnectionRelease message, when the communication device is not in the CE mode; and
   a processing circuit, coupled to the storage device, configured to execute the instructions stored in the storage device.

2. The BS of claim 1, wherein the first duration is predefined, and the second duration is determined according to a number of repetitions, a repetition level of the CE mode or the CE mode.

3. The BS of claim 1, wherein both the first and the second duration are predetermined or predefined.

4. The BS of claim 1, wherein the first duration is longer than the second duration.

5. The BS of claim 1, wherein the BS starts a first timer for counting the first duration when transmitting the RRCConnectionRelease message to the communication device which is in the CE mode, and starts a second timer for counting the second duration when transmitting the RRCConnectionRelease message to the communication device which is not in the CE mode.

6. A base station (BS) of handling communication with a first communication device and a second communication device, comprising:
   a storage device, for storing instructions of:
   configuring a first radio resource control (RRC) connection to the first communication device and a second RRC connection to the second communication device;
   transmitting a first RRCConnectionRelease message via the first RRC connection to the first communication device and a second RRCConnectionRelease message via the second RRC connection to the second communication device;
   determining that the first communication device leaves a connected mode after a first duration from transmitting the first RRCConnectionRelease message, when the first communication device is in a coverage enhancement (CE) mode; and
   determining that the second communication device leaves the connected mode after a second duration from transmitting the second RRCConnectionRelease message, when the second communication device is not in the CE mode; and a processing circuit, coupled to the storage device, configured to execute the instructions stored in the storage device.

7. The BS of claim 6, wherein the first duration is longer than the second duration.

8. The BS of claim 6, wherein the first duration is predefined, and the second duration is determined according to a number of repetitions, a repetition level of the CE mode or the CE mode.

9. The BS of claim 6, wherein both the first duration and the second duration are predetermined or predefined.

10. The BS of claim 6, wherein the BS starts a first timer for counting the first duration when transmitting the first RRCConnectionRelease message to the first communication device which is in the CE mode, and starts a second timer for counting the second duration when transmitting the second RRCConnectionRelease message to the second communication device which is not in the CE mode.

* * * * *